United States Patent [19]

Scott, Jr. et al.

[11] Patent Number: 4,920,672

[45] Date of Patent: May 1, 1990

[54] MEDICAL PENDANT WITH ENHANCED VISIBILITY

[75] Inventors: Frederick W. Scott, Jr.; Joseph P. Santi, both of Pembroke Pines, Fla.

[73] Assignee: Medi-Quip, Inc., Davie, Fla.

[21] Appl. No.: 272,817

[22] Filed: Nov. 18, 1988

[51] Int. Cl.⁵ ............................................. G02B 27/02
[52] U.S. Cl. ......................................................... 40/363
[58] Field of Search .................................. 40/361–365; 63/18, 19; 350/133, 140, 142

[56] References Cited

U.S. PATENT DOCUMENTS

| | | | |
|---|---|---|---|
| D. 278,609 | 4/1985 | Satterelli . | |
| 3,061,961 | 11/1962 | Cohen | 40/363 |
| 3,384,436 | 5/1968 | Kunnel | 40/364 X |
| 4,249,330 | 2/1981 | Chioffe . | |
| 4,530,570 | 7/1985 | Vitrac | 40/363 X |

OTHER PUBLICATIONS

Eastman Kodak Company Brochure, "Storage & Preservation of Microfilms", 1981.

Xidex Corporation Brochure, "Film–A Primer", undated.

Primary Examiner—James R. Brittain
Attorney, Agent, or Firm—Robert C. Kain, Jr.

[57] ABSTRACT

In one embodiment, the medical pendant includes a hollow center, elongated plastic housing with two opposing open ends. The housing is made of a material that is translucent and diffuse light into the housing's interior. A magnifying glass is sealingly mounted in the interior of the housing at one end thereof. A film retainer is removably mounted at the other end of the housing opposite the magnifying lens. The film retainer is made of a material that is also translucent to light and diffuses light into the interior of the housing. The medical or physical information is carried on a diazo film having a solid color background with light transmissive characters depicting the information. The film is mounted on an inboard surface of the film retainer. More particularly, the diazo film has a solid blue background with transparent characters.

15 Claims, 1 Drawing Sheet

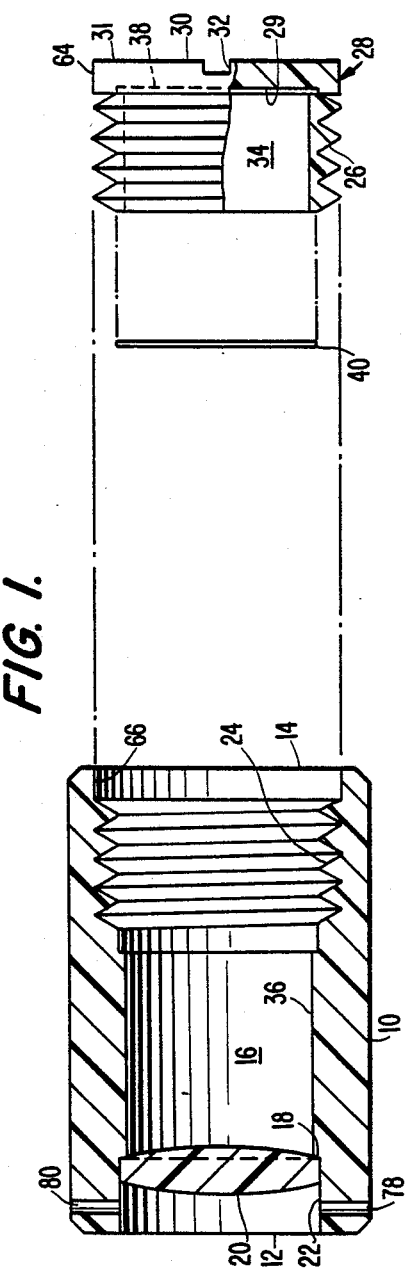
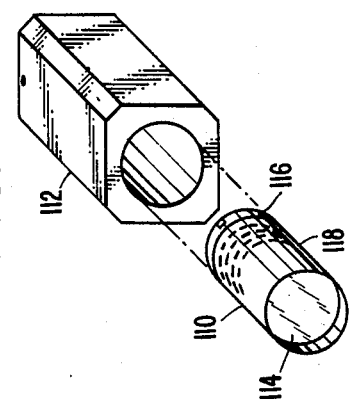
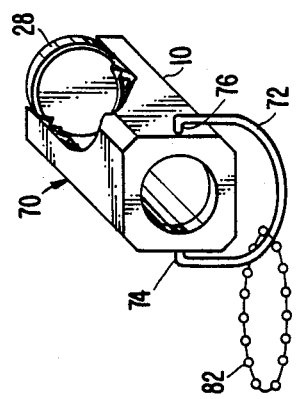
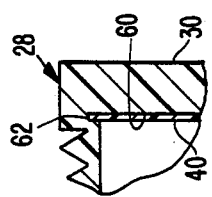
FIG. 1.
FIG. 2.
FIG. 3.
FIG. 4.

MEDICAL PENDANT WITH ENHANCED VISIBILITY

BACKGROUND OF THE INVENTION

The present invention relates to a pendant for viewing medical information.

U.S. Pat. No. 4,249,330 to Chioffe discloses a medical pendant which includes an elongated metal tube having two open ends. A magnifying glass is mounted at one end of the tube. At the other end, a film module is snapped into the tube. The film module has a light transmitting, planar end wall that is translucent to light and that spreads light evenly over a piece of microfilm mounted on the inboard surface of the wall. The film contains medical information that is capable of being read by the person wearing the medical pendant. U.S. Des. Pat. No. 278,609 to Satterelli discloses a medical pendant, microfilm reader. The Satterelli medical pendant is made of a clear or transparent plastic material. An actual embodiment of the Satterelli medical pendant discloses that the microfilm, that carries the medical information, is mounted in a film retaining cap which is in turn permanently affixed to the body of the capsule. At the other end of the capsule is a magnifying lens formed by the plastic housing such that a person can read the microfilm by looking from the magnifying end of the capsule to the opposite end, that is, towards the microfilm.

OBJECTS OF THE INVENTION

It is an object of the present invention to provide a medical pendant which carries medical information on microfilm and the pendant and film are specially configured to enhance the visibility of the information on the film.

It is another object of the present invention to provide a medical pendant wherein the retainer holding the microfilm is removable such that the information carried by the pendant can be easily updated.

It is a further object of the present invention to provide a medical pendant using a diazo film having a solid color background with light transmissive characters to better enhance the visibility of the medical information on the film.

It is an additional object of the present invention to provide a medical pendant wherein the housing of the pendant proper is made of the same translucent and light diffusing material as is the film retainer, thereby causing better visibility of the medical information on the film.

It is another object of the invention to provide a medical pendant that is entirely hypo-allergenic.

SUMMARY OF THE INVENTION

In one embodiment, the medical pendant includes a hollow center, elongated plastic housing with two opposing open ends. The housing is made of a material that is translucent and diffuses light into the housing's interior. A magnifying glass is sealingly mounted in the interior of the housing at one end thereof. A film retainer is removably mounted at the other end of the housing opposite the magnifying lens. The film retainer is made of a material that is also translucent to light and diffuses light into the interior of the housing. The medical or physical information is carried on a diazo film having a solid color background with light transmissive characters depicting the information. The film is mounted on an inboard surface of the film retainer. More particularly, the diazo film has a solid blue background with transparent characters.

BRIEF DESCRIPTION OF THE DRAWINGS

Further objects and advantages of the present invention can be found in the detailed description of the preferred embodiments when taken in conjunction with the accompanying drawings in which:

FIG. 1 illustrates an exploded, cross-sectional and partially broken away view of one embodiment of the medical pendant;

FIG. 2 illustrates a detailed view of one corner of the film retainer;

FIG. 3 illustrates an assembled medical pendant in accordance with the principles of the present invention; and FIG. 4 illustrates another embodiment of the present invention.

DETAILED DESCRIPTION OF THE PREFERRED EMBODIMENTS

The present invention relates to a medical pendant for viewing medical information contained on microfilm.

FIG. 1 illustrates an exploded view of the medical pendant. The pendant includes an elongated, hollow center, plastic housing 10. Housing 10 is open at end 12 and at end 14. Housing 10 defines cylindrical bore 16 Adjacent end 12, bore 16 widens at annular shoulder 18. A magnifying lens 20 is mounted in interior 16 at shoulder 18. Magnifying lens 20 is made of transparent or clear plastic material. Preferably, lens 20 is an optical grade acrylic lens. The diameter of the lens is 0.002 to 0.003 inches larger than the diameter of core section 22, that is, interior 16 axially outboard shoulder 18. In one embodiment, core section 22 has a diameter between 0.310 and 0.308 inches. Therefore, the lens is mounted in housing 10 by a significant interference fit. The lens deform the plastic housing and is therefore sealingly mounted in interior 16.

Housing 10 is made of a translucent material that diffuses light into interior 16. The housing is not transparent to light since it has been determined that too much light produces a glare on the microfilm and thereby affects the visibility of the information on the film.

Near end 14, core section 24 has a plurality of female threads that are complementary to male threads 26 of film retainer 28. Film retainer 28 is made of the same material as plastic housing 10. In one embodiment, plastic housing 10 and film retainer 28 are made of DELRIN plastic. This plastic is hypo-allergenic and is in the nylon family. Also, this type of plastic will not eat away or adversely affect the acrylic lens 20.

A groove 32 is formed on the outboard surface 30 of film retainer 28. The groove is sized to fit a dime such that the film retainer can be removed from plastic housing 10. Film retainer 28 defines, on its inboard side, a partial bore 34 that has the same diameter as center core 36 defining interior 16. An annular groove 38 is formed on the inboard side 29 of end wall 31 in which is mounted microfilm 40.

Microfilm 40 is a diazo film having a solid color background with light transmissive characters depicting the medical information. Preferably, the film has a blue background. The diazo film was selected because the information carried by the film is much more easily read since the contrast between the blue background and the light transmissive characters is considerably better than other types of microfilms such as silver films. Silver films were used in conjunction with U.S. Pat. No. 4,249,330 to Chioffe and Design Pat. No. 278,609 to Satterelli. Since the distance, in one embodiment, between lens 20 and film 40 when they are mounted in the housing is only 0.540 inches, any flaws on the microfilm, such as a grainy background, are exaggerated and are highly visible to the person viewing the information on the film. The diazo film provides a saturated, solid color background that is not grainy when compared with other films. This is particularly true when comparing the blue line diazo film to the previously used silver microfilm. The translucent, light diffusing characteristic of the housing and the film retainer also affects the visibility and readability of the medical information carried on the film. The light is diffused as it enters interior 16 and hence there is no glare on the inboard surface of the film, i.e., the surface exposed to interior 16. Since the medical pendant carries potentially life saving information, e.g., information that the person has diabetes, if the person wearing the pendant has a medical emergency, such as becoming unconscious, members of the public and medical personnel must quickly view the film and ascertain whether the information in the pendant is helpful in diagnosing the person's condition. Hence, visibility of the information is critical. Further, the medical emergency could occur at any time or in any location. Therefore, the medical information must be visible under a wide variety of conditions such as low light, bright light and artificial light. Accordingly, the translucent characteristic of the plastic is important.

FIG. 2 illustrates a detail view of a corner of film retainer 28 wherein microfilm 40 is mounted on the inboard face 60 of end wall 31 of the film retainer. The film retainer has an undercut diameter forming annular groove 62. In one embodiment, the partial bore 34 of film retainer 28 has a diameter from 0.289 to 0.291 inches and the undercut annular groove 62 has a diameter from about 0.296 to 0.298 inches. The total outside diameter of plastic housing 10 in this embodiment is from about 0.384 to 0.386 inches.

Retainer 28 has an axial cap surface 64 that is sized t fit within core section 66 of plastic housing 10. When completely inserted and threadably mounted within the housing, as shown in FIG. 3, one embodiment of the medical pendant has a length from about 0.660 to 0.665 inches.

Given these dimensions, it is very important that the microfilm clearly depict the medical or physical information. The diazo film greatly enhances the visibility of the medical information due to its non-grainy, solid color background.

FIG. 3 shows medical pendant 70 completely assembled. Plastic loop 72 is affixed to one end of pendant 70 by radially inwardly protruding legs 74 and 76 that are disposed within opposing radial bores 78 and 80 shown in FIG. 1. A chain or other mechanism 82 enables medical pendant 70 to be placed around the neck, wrist or ankle of a person. Chain 82 in one embodiment is a plastic DELRIN chain. Chain 82 and loop 72 may be metal when the pendant is used for other purposes.

One use of the medical pendant is by persons admitted into hospitals. The amount of medical information capable of being placed on the microfilm includes the following:

Since some of this information may change either during the patient's stay in the hospital or after the patient leaves the hospital, for example a list of contraindicated drugs, it is important that the present medical pendant have a film retainer that is both sealingly mounted to the housing as well as removably mounted to the housing. Since the film retainer is threadably attached to the housing, rather than discarding the entire medical pendant when the information on the microfilm must be changed, the film retainer can be detached from the housing and a new film retainer having the updated medical information on the microfilm can be screwed on the housing. It is important that the medical pendant have a water tight seal because if worn by a patient in a hospital, the pendant may be subjected to washing, etc. Water may deteriorate the microfilm and at a minimum would adversely affect the visibility of the microfilm. FIG. 4 shows another embodiment of the present invention wherein housing unit 110 is cylindrically shaped and is inserted within metal casing 112. Plastic housing 110 includes a magnifying lens 114 at one end and a film retainer 116 at the other end. Metal casing 112 can be decorative but is particularly sized only to cover the exterior surface 118 of cylindrical plastic housing unit 110. Therefore, light is admitted into the interior of housing 110 via film retainer 116. Metal casing 112 can include decorative features such that the medical pendant appears to be a piece of jewelry rather than simply a very small plastic tube.

The claims appended hereto are meant to cover modifications and changes within the scope and spirit of the present invention.

What is claimed is:

1. A pendant for viewing medical or physical information comprising:
    a hollow center, elongated plastic housing with two opposing open ends made of a material that is translucent to light and which diffuses light into the housing's interior;
    magnifying lens sealingly mounted in said interior at one end of the housing, said lens providing a first closure for said interior adjacent said one end;
    a film retainer sealingly and removably mounted at the other end, opposite said one end, of said housing, said film retainer made of a material that is translucent to light such that light is diffused through said retainer, said film retainer providing a second closure for said interior adjacent said other end; and
    a diazo film having a solid color background with light transmissive characters depicting said information, said film mounted on an inboard surface of said film retainer;
    wherein said film retainer is threadably attached to said housing.

2. A pendant as claimed in claim 1 wherein said background of said film is blue.

3. A pendant as claimed in claim 2 wherein said film is mounted in an annular groove on said inboard side of said film retainer.

4. A pendant as claimed in claim 2 wherein said housing and said film retainer are made of the same material.

5. A pendant as claimed in claim 2 wherein said lens is mounted in said housing by an interference fit.

6. A pendant as claimed in claim 5 wherein said lens is made of an optical grade acrylic material.

7. A pendant as claimed in claim 1 including an elongated, hollow metal casing with two open ends, said casing sized to fit over the exterior surface of said housing.

8. A pendant for viewing medical or physical information comprising:
   a hollow center, elongated plastic housing with two opposing open ends made of a material that is translucent to light and which diffuses light into the housing's interior;
   a magnifying lens sealingly mounted in said interior at one end of the housing, said lens providing a first closure for said interior adjacent said one end;
   a film retainer sealingly and removably mounted at the other end, opposite said one end, of said housing, said film retainer made of a material that is translucent to light such that light is diffused through said retainer, said film retainer providing a second closure for said interior adjacent said other end; and
   a diazo film having a solid color background with light transmissive characters depicting said information, said film mounted on an inboard surface of said film retainer;
   wherein said housing and said film retainer are made of the same material.

9. A pendant as claimed in claim 8 wherein said background of said film is blue.

10. A pendant as claimed in claim 9 wherein said film is mounted in an annular groove on said inboard side of said film retainer.

11. A pendant as claimed in claim 9 wherein said lens is made of an optical grade acrylic material.

12. A pendant for viewing medical or physical information comprising:
   a hollow center, elongated plastic housing with two opposing open ends made of a material that is translucent to light and which diffuses light into the housing's interior;
   a magnifying lens sealingly mounted in said interior at one end of the housing, said lens providing a first closure for said interior adjacent said one end;
   a film retainer sealingly and removably mounted at the other end, opposite said one end, of said housing, said film retainer made of a material that is translucent to light such that light is diffused through said retainer, said film retainer providing a second closure for said interior adjacent said other end; and
   a diazo film having a solid color background with light transmissive characters depicting said information, said film mounted on an inboard surface of said film retainer; and
   an elongated, hollow metal casing with two open ends, said casing sized to fit over the exterior surface of said housing.

13. A pendant as claimed in claim 12 wherein said background of said film is blue.

14. A pendant as claimed in claim 13 wherein said film is mounted in an annular groove on said inboard side of said film retainer.

15. A pendant as claimed in claim 13 wherein said film retainer is threadably attached to said housing.

* * * * *